No. 812,208. PATENTED FEB. 13, 1906.
W. R. KAHLENBERG.
CRANK.
APPLICATION FILED SEPT. 9, 1905.
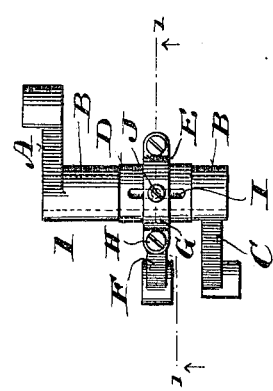
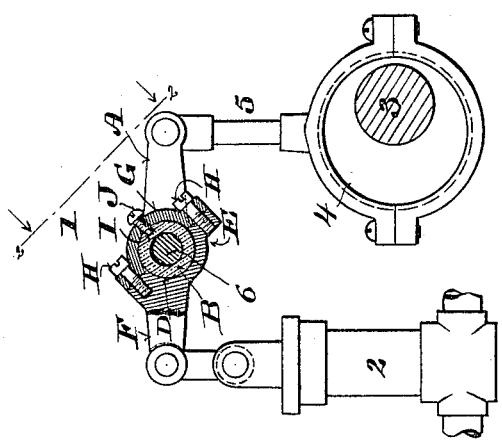

UNITED STATES PATENT OFFICE.

WILLIAM R. KAHLENBERG, OF TWO RIVERS, WISCONSIN.

CRANK.

No. 812,208.     Specification of Letters Patent.     Patented Feb. 13, 1906.

Application filed September 9, 1905. Serial No. 277,776.

*To all whom it may concern:*

Be it known that I, WILLIAM R. KAHLENBERG, a citizen of the United States, and a resident of Two Rivers, in the county of Manitowoc and State of Wisconsin, have invented certain new and useful Improvements in Cranks; and I do hereby declare that the following is a full, clear, and exact description thereof.

The object of my invention is to provide a simple and effective crank for tranmission of power and which will give way under an overload from any cause without damage to said crank; and it consists in certain peculiarities of construction and combination of parts to be hereinafter fully set forth, with reference to the accompanying drawings, and subsequently claimed.

In said drawings, Figure 1 represents an elevation of a crank embodying the features of my invention, partly in section, as indicated by line 1 1 of Fig. 2, said crank being shown in connection with a pump and power-shaft of an explosive-engine to better illustrate the application thereof; and Fig. 2 is a plan view of the crank looking from the direction indicated by the arrows and dotted line 2 2 of Fig. 1.

Referring by characters to the drawings, 1 represents the crank, which in this instance is shown as applied to the pump 2 and connected to a shaft 3 of an explosive-engine, (not shown,) the said pump being used for the purpose of circulating water through the cooling-jacket of the engine-cylinder. The shaft 3 is provided with a strap-eccentric 4, which is secured by a pitman 5 to an arm A of the crank, and this arm has a hollow hub B extending therefrom for the reception of a fulcrum-stud 6, on which said crank is oscillated. The opposite end of the hub B is provided with an arm C, which, together with arm A, is preferably cast in one piece with said hub, the arms being upon opposite sides of the fulcrum-stud. The arm C is provided as a convenient means of connection with a sparking mechanism (not shown) and in many instances may be dispensed with. The sleeve B is preferably provided with a slightly-raised portion D, which is turned to receive a hub E of an arm F. The hub is split and secured to said sleeve by a cap G and screws H. To prevent the arm F from twisting upon said sleeve, the latter is longitudinally recessed at I for the reception of a threaded break-pin J, which passes through and is in threaded connection with the cap G. The said recess I is elongated to permit longitudinal adjustment of the arm F with relation to the arm A, and arm F is provided with a split hub for the purpose of attaching it to the sleeve B when said crank is constructed with a sparking arm C; but where this arm is dispensed with it is obvious that a solid hub may be substituted for the split hub E, the locking-screw in either case being used in the same manner.

In explosive-engines, to which my device is particularly adapted, it is necessary to provide a pump for circulating water through the cooling-jacket of the cylinder, and when an engine of this type is at rest it frequently happens that the water remaining in the pump or its connections will freeze. This cuts off the circulation, and when the pump is started the stoppage will throw undue strain upon the pump and its driving connections, thereby causing a break, which will occur in the pump-crank and necessitate the substitution of a new crank, and thus incurring expense and delay. With my device under the conditions just described the strain will simply cut off the end of the locking-screw J, which will disconnect the pump-arm F from the power-arm A, so that the latter is free to reciprocate with the power-shaft without affecting the pump until another locking-screw is put into place.

Having thus described my invention, what I claim as new, and desire to secure by Letters Patent, is—

A crank having a hollow hub, arms extending therefrom at either end, a longitudinal exterior groove in the hub, a split hub arranged over the groove, tightening-bolts connecting the split-hub members, whereby he latter may be adjusted longitudinally of said hub, and held in frictional contact against the latter, a supplementary screw in threaded connection with one member of said split hub, arranged to impinge against the bottom wall of said groove, whereby the hub is held against twisting under normal strain and also held against longitudinal movement, and an arm extending from the other member of the aforesaid split hub.

In testimony that I claim the foregoing I have hereunto set my hand, at Two Rivers, in the county of Manitowoc and State of Wisconsin, in the presence of two witnesses.

WILLIAM R. KAHLENBERG.

Witnesses:
FRED W. DICKE,
AUGUST DRAEGER.